Nov. 18, 1969   H. A. RASCHKE   3,478,992
QUICK RELEASE MOUNT FOR WHEEL MOUNTED APPLIANCE
Filed Nov. 21, 1967   2 Sheets-Sheet 1
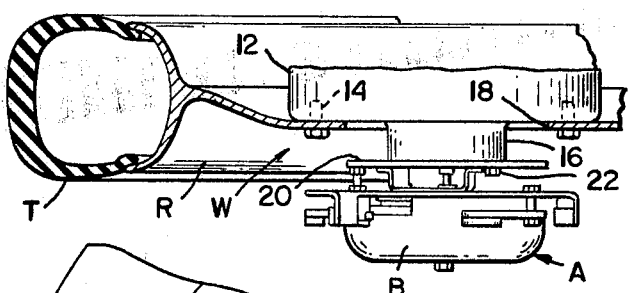
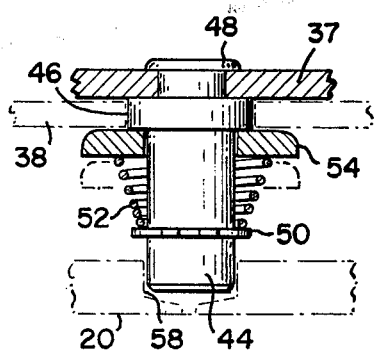
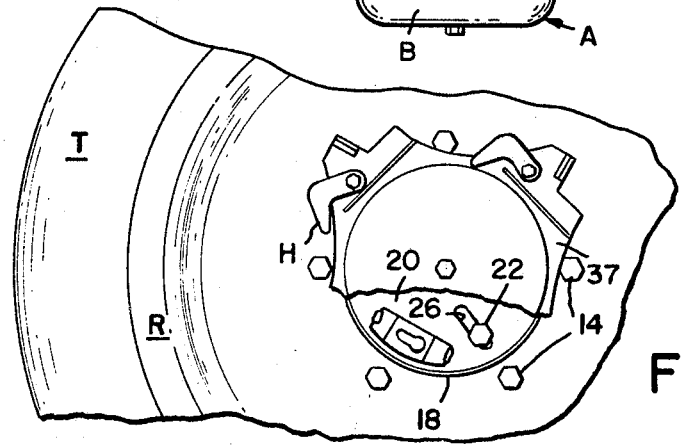
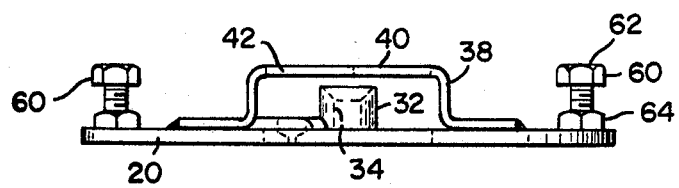
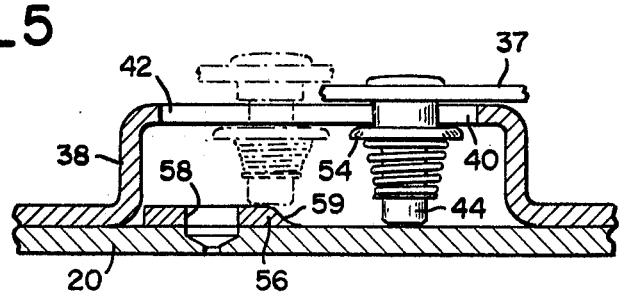
*INVENTOR.*
HERBERT A. RASCHKE
BY
Townsend and Townsend
ATTORNEYS Nov. 18, 1969    H. A. RASCHKE    3,478,992
QUICK RELEASE MOUNT FOR WHEEL MOUNTED APPLIANCE
Filed Nov. 21, 1967    2 Sheets-Sheet 2
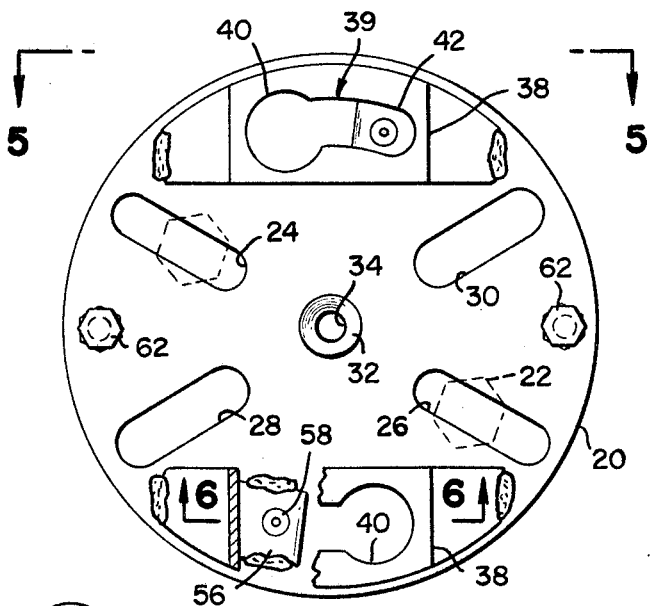
FIG_3
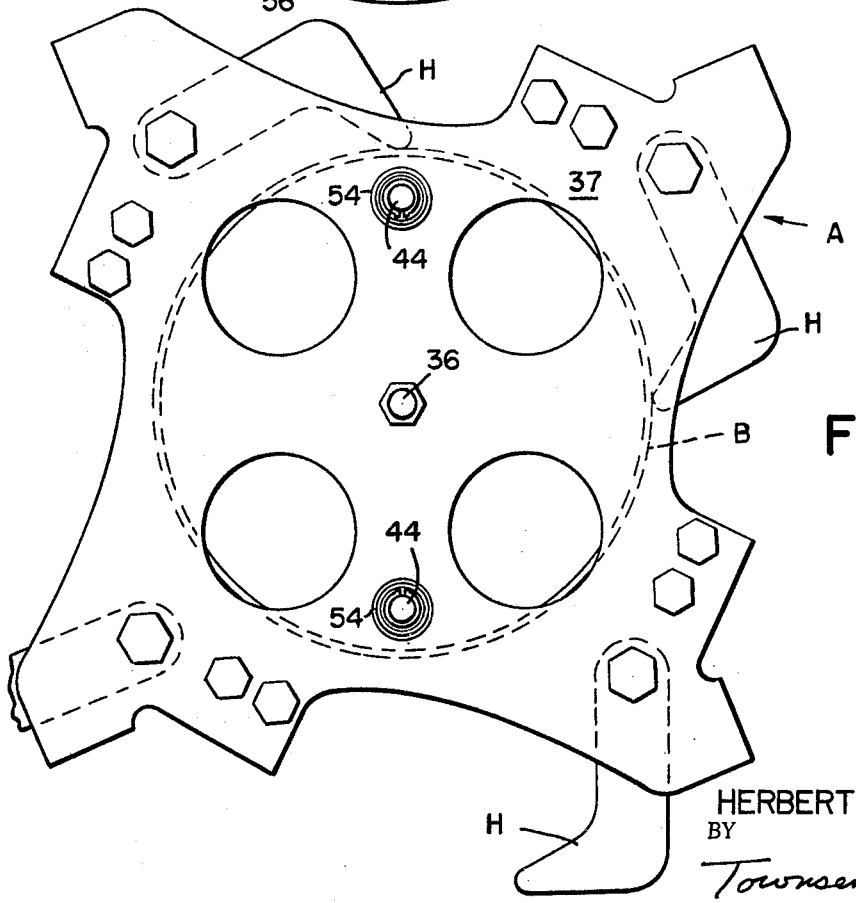
FIG_4
INVENTOR.
HERBERT A. RASCHKE
BY
Townsend and Townsend
ATTORNEYS

United States Patent Office 3,478,992
Patented Nov. 18, 1969

3,478,992
QUICK RELEASE MOUNT FOR WHEEL MOUNTED APPLIANCE
Herbert A. Raschke, Greenbrae, Calif., assignor to E. D. Bullard Company, Sausalito, Calif.
Filed Nov. 21, 1967, Ser. No. 684,753
Int. Cl. A47f 5/00; B60q 1/26; B60b 7/00
U.S. Cl. 248—205                        3 Claims

ABSTRACT OF THE DISCLOSURE

A mechanism for mounting an appliance on the hub of a wheel such that the appliance can be removed quickly to permit removal of the wheel for tire repair and the like. The mechanism includes two parts; one of the parts is permanently mounted on the hub and the other carries the appliance. The permanently mounted part is of sufficiently small size that it does not obstruct removal of the wheel. The other part is of sufficient size to carry properly the appliance. The mechanism for joining the two parts is fast acting and is secure in that it has provisions for spring biased axial movement to effect locking against rotative movement.

---

This invention relates to a structure for mounting a device such as a back-up alarm to the hub of a vehicle wheel in such a way that the device can be quickly removed from the wheel hub to permit removal of the wheel as may be necessary for repair.

Wheel mounted back-up alarms, such as are described in U.S. Patents Nos. 2,807,229; 2,843,075; 2,915,036; and 3,092,069, have been widely adopted and have been successful in preventing many industrial accidents. Because the alarms are typically mounted on industrial or construction equipment that is subjected to hard usage, there frequently arises a need to remove the alarms in order to obtain access to the wheel or tire rim of the vehicle. Removal of the wheel is expedited by employment of a quick release mount according to the present invention for mounting the back-up alarm on the wheel. The mount comprises two parts; one part that is permanently mounted on the wheel axle and which has a size less than the opening at the center of the rim, and a second part that carries the back-up alarm. Each of the parts include interengageable members for securely locking the two parts together. The members are subject, however, to quick release or disengagement.

Because the magnitude of noise produced by wheel mounted mechanical back-up alarms is proportional to the diameter of the bell employed, large diameter bells are necessary or desirable in most locations. Such bells typically have an outside diameter greater than the inner diameter of a wheel rim so that in order to effect tire repair, it is necessary to remove the bell to remove the wheel rim from the hub. Removal of the bell is a tedious, time-consuming task which tends to encourage omission of the bell when a wheel is replaced after repair.

The present invention encourages replacement of the back-up alarm each time a wheel is removed because the apparatus provides a mounting structure that includes a plate adapted for permanent mounting on the wheel axle hub. The plate is small enough to avoid interfering with removal of the wheel, and is provided with means for releasably securing thereto the back-up alarm. The securing means includes a quick release mechanism that permits removal of the back-up alarm after twisting the back-up alarm with respect to the plate through an angle of approximately 10°.

The objects, features and advantages of the present invention will be more apparent after referring to the following specification and accompanying drawings in which:

FIGURE 1 is a plan view in partial cross-section showing a mounting device according to the present invention in place on a wheel hub for supporting a back-up alarm on the hub;

FIGURE 2 is a fragmentary elevation view of FIGURE 1;

FIGURE 3 is an elevation view of the outer surface of the mounting plate of the present invention;

FIGURE 4 is a plan view of the rear face of a back-up alarm that has provisions for removably securing it to the mounting plate shown in FIGURE 3;

FIGURE 5 is a side view of the mounting plate taken along line 5—5 of FIGURE 3;

FIGURE 6 is a view at enlarged scale of the interengaging parts of the back-up and mounting plate shown in a position of partial engagement; and FIGURE 7 is a view of a portion of FIGURE 6 at an enlarged scale and showing the parts in a fully-locked position.

Referring more particularly to the drawing, a back-up alarm A, includes a bell B and pivotably mounted hammers H that strike the bell in response to reverse rotation of a wheel structure W on which the alarm is mounted. The particular alarm shown is disclosed in more detail in U.S. Patent No. 2,807,229. It is sufficient for present purposes to say that when the wheel W rotates in one direction, the hammers H strike bell B to provide a warning sound.

Wheel assembly W includes a wheel rim R on which a tire T is mounted; rim R is mounted onto a brake drum or like wheel part 12 by means of bolts or studs 14. Extending centrally from brake drum 12 is an axle hub 16. Wheel rim R has a central hole 18 that has a diameter greater than the diameter of hub 16. Accordingly, the rim and tire can be quickly removed from the wheel by removing bolts 14.

The present invention provides a mounting plate 20 that is secured on hub 16 by a plurality of bolts 22. Bolts 22 are typically provided for supporting the axle hub assembly in operative relation; the bolts afford a simple expedient for mounting plate 20 because existing bolts can be removed and replaced with longer bolts to retain plate 20 on the hub. So that plate 20 is suitable for installation on various sized axles, the plate is formed with two pairs of diametrally opposite elongate slots. As can be seen in FIGURE 3, diametrally aligned slots 24 and 26 are of relatively narrow width to accommodate bolts of relatively small diameter, for example, one-half inch, whereas diametrally aligned slots 28 and 30 accommodate relatively large diameter bolts, for example, five-eighths inch.

As can be seen most clearly in FIGURES 1 and 2, the outer diameter of plate 20 is less than the diameter of hole 18 in wheel rim R so that the wheel rim can be mounted onto and removed from the axle hub without requiring removal of the mounting plate. Mounting plate 20 includes in accordance with the present invention structure for affording a quick release mounting to the plate of back-up alarm A or like hub-mounted device.

Centrally of the plate is a sleeve 32 that is bored to define a socket opening 34. Back-up alarm A includes a pin 36 that extends from the rear face of a base plate 37; pin 36 is receivable in socket opening 34 to position the base plate of the back-up alarm centrally on plate 20. Radially spaced from sleeve 32 is one or more raised web members 38 which form keyhole shaped locking openings 39 that have a relatively wide portion 40 and a relatively narrow portion 42. As can be seen most clearly in FIGURE 3, opening 39 has a generally arcuate configuration, the center of the radius of curvature of which is socket opening 34. Backing plate 37 of back-up alarm A has projecting therefrom posts 44 that are radially spaced from center pin 36 by an amount that corresponds to the amount of radial spacing between socket 34 and keyhole openings 39 in mounting plate 20.

As can be seen in FIGURE 7, post 44 has a circular shoulder 46 which in cooperation with a peened over portion 48 firmly retains the post on backing plate 37. Circular portion 46 has a thickness somewhat less than the thickness of web 38 and a diameter slightly less than the width of relatively narrow portion 42 of keyhole opening 39. Outwardly of backing plate 37, post 44 has a groove for positioning a split retaining ring 50. The retaining ring forms a bearing surface for a compression spring 52 that circumscribes post 44 and functions to bias a circular flange 54 toward shoulder 46.

For receiving the portion of post 44 that extends beyond retaining ring 50 there is formed on the surface of mounting plate 20 a camming surface 56. Within camming surface 56 in alignment with narrow portion 42 of keyhole opening 39 is a bore 58 adapted to receive the free end of pin 44. Camming surface 56 has a ramp 59 that slopes gradually from the outer surface of mounting plate 20 to the camming surface.

When pin 44 is seated within bore 58, the face of backing plate 37 of the back-up alarm structure rests against raised webs 38. Although the surface area of webs 38 is sufficient to support the back-up alarm in a vertical plane, additional stability is afforded by providing at points that are circumferentially spaced from raised webs 38, one or more bolts 60 that have outer surfaces of their heads 62 disposed coplanarly with the outer surface of raised web 38. For so supporting bolts 60, a nut 64 is welded onto the surface of mounting plate 20 and bolt 60 is threaded into the nut to a degree necessary to establish surface 62 in the plane of the outer surfaces of webs 38. In the particular embodiment of the invention shown in the drawings (FIGURE 3), four areas of support are provided, two by bolt head surfaces 62 and two by raised webs 38. Thus, when the back-up alarm is engaged onto the mounting plate, the surface of backing plate 37 resides in the plane defined by bolt head surfaces 62 and the outer surfaces of raised webs 38.

In order to install back-up alarm A onto a wheel hub on which mounting plate 20 is secured, pin 36 is inserted into socket 34, and posts 44 and their associated flanges 54 are aligned with holes 40 in raised webs 38. Back-up alarm A is moved axially inwardly toward plate 20 until the surface of backing plate 37 contacts the surfaces of webs 38 and bolts 60 as shown in FIGURE 6. Rotation of the back-up alarm with respect to mounting plate 20 causes pin 44 to move from relatively wide portion 40 of keyhole opening 39 to the relatively narrow portion 42. Consequently, the lower surface of web 38 adjacent narrow portion 42 engages flange 54. As rotation is continued, pin 44 moves up ramp 59 and as shown in the broken line portion of FIGURE 6, spring 52 is compressed. Continued rotation of the back-up alarm permits pin 44 to move into bore 58; the force of spring 52 biases the pin into the bore so as to firmly support the back-up alarm onto mounting plate 20 without dislodgement due to vibration and without excessive relative movement between the back-up alarm and the mounting plate. In order to remove the back-up alarm such as may be necessary to remove wheel W from brake drum 12, back-up alarm A is pulled axially outwardly against the force of spring 52 to lift pin 44 out of bore 58. When the pin clears the bore, the back-up alarm can be rotated to move pin 44 into registry with relatively large portion 40 of keyhole opening 39. At the latter position, back-up alarm A can be fully disconnected from mounting plate 20 to permit removal of wheel W from the brake drum.

It will be noted that the back-up alarm is retained in a stable position when engaged on mounting plate 20, because the combined surface areas of raised webs 38 and bolt surfaces 62 contact plate 37 at plural points. Springs 52 bias the face of backing plate 37 into contact with the raised webs and the bolt surfaces to prevent excessive vibratory movement of the back-up alarm structure with respect to mounting plate. Such spring force also retains pins 44 in engagement with bores 58 so as to prevent relative rotative movement of the back-up alarm with respect to the mounting plate. However, removal of the back-up alarm is accomplished expeditiously, because a convenient handgrip can be had on backing plate 37 to move the back-up alarm axially and rotatively so as to disengage pin 44 from bore 58.

Thus, it will be seen that the present invention provides a quick release mounting device for wheel hub mounted appliances, such as back-up alarms. Such quick release mounting is important insofar as effecting convenient removal of the appliance in order to perform necessary repair work or replacement work on the wheels or tires of the vehicles on which the appliance is mounted.

Although one embodiment of the invention has been shown and described, it will be apparent that other adaptations and modifications can be made without departing from the true spirit and scope of the invention.

What is claimed is:

1. Apparatus for mounting a device onto the hub of an axle that supports a wheel having therein a central hole of a given diameter, the apparatus comprising a plate defining a socket centrally thereof and having an outer diameter less than the diameter of the wheel hole, means for affixing said plate to said axle hub so that the wheel can be mounted onto and removed from the axle hub without removal of the plate, said device having a pin receivable in said socket so as to afford pivotable movement of said device relative said plate, said plate further having means defining at least one lock opening spaced radially from said socket, said opening having a relatively narrow portion and a relatively wide portion, said device having projecting therefrom a post movable in said opening between said wide portion corresponding to a first, unlocked position of the device and said narrow portion corresponding to a second, locked position of the device, a flange supported on the said post and having an outer diameter less than the wide portion of said opening so that the flange can enter the opening at the wide portion, the diameter of said flange being greater than the narrow portion of said opening so that when moved to said second locked position axial movement of said device relative said mounting plate is inhibited, and releasable retaining means demountably securing said device to said plate, said last mentioned means including means engaging said pin in said second locked position and limiting movements of said pin in a radial direction while said pin is so engaged, and means for resiliently biasing said flange relative said device to bias said post into said engaging means.

2. The invention of claim 1 wherein said device includes a raised web that has a portion defining said lock opening and wherein said pin engaging means comprises a portion of said device defining a bore beneath said web in alignment with the narrow portion of said lock opening and adapted to receive said post therein.

3. The invention of claim 2 including at least two support members mounted on said plate and circumferentially spaced from said raised web, said members having outer surfaces residing in coplanar relation to said raised web, said device including a backing plate that defines a planar surface for resting on said support members and said raised web when said device is in the second locked position.

References Cited

UNITED STATES PATENTS

| | | | |
|---|---|---|---|
| 2,110,133 | 3/1938 | Douglas | 339—127 X |
| 2,807,229 | 9/1957 | Bookwalter | 116—35 |
| 2,843,075 | 7/1958 | Geraghty | 116—35 X |
| 2,915,036 | 12/1959 | Bookwalter | 116—35 |
| 3,078,124 | 2/1963 | Mulder | 301—37 |
| 3,092,069 | 6/1963 | Baird | 116—60 |

ROY D. FRAZIER, Primary Examiner

J. F. FOSS, Assistant Examiner

U.S. Cl. X.R.

116—35; 248—223; 301—37